United States Patent [19]

Germonprez et al.

[11] 4,166,044

[45] Aug. 28, 1979

[54] BINDERLESS THERMOTROPIC JET INK

[75] Inventors: Raymond L. Germonprez; Paul Zimmerman, both of Neenah, Wis.

[73] Assignee: American Can Company, Greenwich, Conn.

[21] Appl. No.: 910,900

[22] Filed: May 30, 1978

[51] Int. Cl.$^2$ ............................................. G01N 31/22
[52] U.S. Cl. ................................. 252/408; 23/230 R; 73/356; 101/32; 106/22; 206/459; 428/913
[58] Field of Search ............................. 73/356; 101/32; 252/408 R; 23/230 R; 428/913; 206/459; 106/8, 22

[56] References Cited

U.S. PATENT DOCUMENTS

| | | | |
|---|---|---|---|
| 2,606,654 | 8/1952 | Davis et al. | 252/408 X |
| 3,386,807 | 6/1968 | Edenbaum | 252/408 X |
| 3,667,916 | 6/1972 | Slvia et al. | 252/408 X |
| 4,015,937 | 4/1977 | Miyamoto et al. | 252/408 X |

Primary Examiner—Leland A. Sebastian
Attorney, Agent, or Firm—Robert P. Auber; Ira S. Dorman; Ernestine C. Bartlett

[57] ABSTRACT

Binderless ink compositions suitable for use in jet printing operations on polymeric resin surfaces to form images which are highly resistant to abrasion and to steam pasteurization or sterilization conditions by penetration of the colorant into the sub-surface structure of the resin, are provided. The ink compositions are thermotropic, i.e. they change color in the presence of water or steam at elevated temperature and are useful as sterilization or pasteurization indicators. The preferred inks comprise either (1) a colorant which reacts under the sterilization conditions or (2) a combination of colorants one of which is extractible under sterilization conditions; a water and alcohol solvent system; a surfactant; an aliphatic or cyclic ketone, aldehyde, acetal, ether or ester and, optionally, an aliphatic hydrocarbon of 8–12 carbons.

19 Claims, No Drawings

BINDERLESS THERMOTROPIC JET INK

BACKGROUND OF THE INVENTION

1. Prior Art

The prior art appears to be best exemplified by the following patents which were developed in a search:

| Hainsworth | 2,798,855 | July 9, 1957 |
| Hainsworth | 2,798,856 | July 9, 1957 |
| Carumpalos | 3,288,718 | Nov. 29, 1966 |
| Edenbaum | 3,311,084 | March 28, 1967 |
| Edenbaum | 3,360,339 | Dec. 26, 1967 |
| Verses | 3,704,096 | Nov. 28, 1972 |
| Chapman | 3,862,824 | Jan. 28, 1977 |
| Banczak | 4,021,252 | May 3, 1977 |

2. Field of the Invention

Metal cans constitute a very widely utilized medium for the protective packaging of a great variety of products, many millions of cans being used daily for packaging of foods, beverages and many other materials. For many years, the common metal can was constructed of tinplated steel, and was customarily referred to in the industry as an ETP can, the initials standing for "electro-tin-plated." Containers of this type are referred to by the public at large as "tin cans." In recent years, however, the metal can industry has developed organic polymeric resinous coatings for metal cans which offer substantially the same protection to the steel as traditional thin coating of metallic tin. These organic resin based coatings have been applied both as a top coat over the traditional thin tin coating and as the sole protective coating composition applied directly to the steel can body and/or end components to yield both resin coated ETP cans and resin coated untinned steel cans which are now referred to in the industry as "tin-free steel" or TFS cans. This invention is directed primarily to ink compositions suitable for printing identifying indicia on the resin coated surfaces of metal cans including TFS and coated ETP cans as well as coated aluminum cans and can components by means of ink jet printing techniques.

Manufacturing and processing concerns which package various products in metal cans have found it highly desirable to print, at some point on the can surface, a series of coded symbols which carry information of interest primarily to the packager, including the particular machine on which the can was packed, the date and time of packing and perhaps even the identity of the machine operator. Such data are useful in case it is necessary to trace any particular can or cans after they have been packed.

Many of the products packaged in metal cans are subjected to conditions of high temperature and high moisture during pasteurization or sterilization procedures carried out before or after the can is filled with product and sealed. In order to be commercially satisfactory, the coded indicia printed on the cans must be capable of withstanding these processing conditions as well as being resistant to rubbing abrasion.

Another area of interest and need in the art relates to printable sterilization indicators. Such compositions have heretofore utilized pigment combinations, have been applied by contact printing techniques and have been used primarily in determining whether proper sterilization heat has been applied to objects used in medical and surgical procedures. In the manufacturing and processing concerns which package various items in metal cans discussed above, it is highly desirable, in addition to providing coded symbols carrying information of value to the packager, that some means are provided for visually determining when items have been sterilized and/or pasteurized.

The provision of an ink composition which is adapted to a jet printing technique, which is suitable for application to polymer coated surfaces, abrasion resistant and resistant to the high temperature and high moisture during pasteurization or sterilization (while at the same time undergoing a visible and permanent color change when subjected to such processing conditions) is the primary object of this invention. Another object of this invention is to provide a jet ink composition capable of forming markings which show a distinct difference in color among unsterilized and completely sterilized packages.

Further objects of this invention will be apparent from the description of the invention which follows.

SUMMARY OF THE INVENTION

The objectives of this invention are achieved by ink compositions which contain no tackifying resinous binder and in which the solvent system is composed of a homogeneous blend of water, a lower aliphatic alcohol, an oxygenated aliphatic or cyclic ketone, ester or ether and, optionally, an aliphatic hydrocarbon, the only other essential components being a soluble colorant or colorant combination and a surfactant which serves the dual functions of homogenizing agent and electrolyte.

The solvent system is so selected as to soften and swell the organic polymer substrate sufficiently to allow penetration of the colorant into the sub-surface structure thereof, whereby the indicia printed on the substrate become highly resistant to abrasion and to conditions of high temperature and humidity encountered in steam pasteurization and sterilization processes.

The colorant is so selected as to produce a visible color change upon exposure to water or steam at elevated temperature by one of two mechanisms, i.e., through use of a colorant which reacts under process conditions or through use of a combination of dyes one of which is an extractible dye.

DETAILED DESCRIPTION OF THE INVENTION

The ink compositions of the present invention employ the mechanisms of penetration of the organic coating and adhesion to the metal as disclosed in copending application Ser. No. 634,507 filed Nov. 24, 1975 entitled "Binderless Ink For Jet Printing" of Raymond L. Germonprez, a joint inventor herein. As disclosed in said copending application, unlike conventional inks which contain a tackifying, film-forming, resinous binder which serves to bind the colorant to the substrate as an adherent film is formed on the substrate surface upon evaporation of the volatile ink solvents, the inks of the copending application and of the present invention do not form a film over the surface of the polymeric coating which covers the surface of a TFS or ETP can. The inks of the present invention contain solvents which temporarily soften and swell the polymeric resin coating of the TFS can sufficently to allow the colorant component of the ink to penetrate the surface layers of the polymeric coating. Upon removal of the ink solvents by evaporation, the colorant component of the ink remains embedded in the resinous polymeric can coating, primarily within the coating rather than on the surface thereof. The protective coating of the TFS or coated ETP can thereby serves not only as the substrate for supporting the printed indicia, but also as the binder for the ink which, because of the penetration of the colorant into the internal structure of the coating, becomes an integral part of the coating and is substantially immune to abrasion, in contrast to normal inks which remain as a surface film on the coating with little or no penetration thereof.

In order to be effective in the process of the present invention, the ink solvents must be capable of penetrating any waxy or oily lubricating film residues which remain on the surface of the coated TFS can as a result of the processing steps utilized in stamping and shaping the can components from sheet or roll stock, and must effect temporary softening and swelling of the polymeric resin can coating sufficient to allow penetration of the colorant into the swollen body of the coating. The ink solvents, however, must not dissolve or disrupt the can coating, destroy its adhesion to the metal can surface or in any other way deleteriously affect the protective poroperties of the coating.

In the selection of the ink solvents, therefore, consideration must be given to achieving the desired effects on the can coating as well as obtaining the proper solubility for the colorant and other components of the ink and also achieving the desired viscosity and evaporative characteristics, as will be discussed hereinafter.

With regard to the ink solvent effects on the can coating, satisfactory solvents or mixtures of solvents may be selected for use with each of the types of protective coatings customarily utilized on TFS or coated ETP cans, including epoxy resins, polyvinyl chloride, acrylic resins, polyamide-epoxy resin, polyamides, melamine modified alkyds, etherified melamine formaldehyde-styrene resins and butadiene-styrene co-polymers. Ketones, aldehydes and acetals are effective solvents for inks used for printing on coatings of the polyvinyl chloride, epoxy, acrylic and styrene-butadiene copolymer types. Esters and ethers are also effective with epoxy and acrylic type coatings, dimethyl acetamide and halogenated alcohols are effectively used with polyamide resin coatings and polyamide-epoxy resins, while aromatic organic solvents are satisfactory for inclusion in inks for printing on the modified alkyd resins and melamine formaldehyde resins when used as coatings on tin-free steel or ETP can components. In general, the preferred solvents, particularly for use with the epoxy and acrylic type resin coatings predominant in the coated can field are oxygenated organic compounds of either aliphatic, heterocyclic or aromatic type, selected in a particular case for giving rise to the proper degree of softening and swelling of the substrate coating during the jet printing operation.

Especially preferred as solvents herein are aliphatic ketones, for example 2-butanone, 2-pentanone, 2-hexanone, 2-octanone, 2,4-pentanedione, etc.; cyclic ethers such as furan, dioxane, etc.; aliphatic esters including ethyl acetate, propyl acetate, butyl acetate; amides including dimethyl acetamide, etc. Mixtures of such preferred compounds may also be employed.

The properties of the solvent and the characteristics which are imparted to the ink by the solvent are of paramount importance in the present invention. It has been previously pointed out that the overall ink composition must be of relatively low viscosity. Satisfactory results are readily obtainable with inks having a viscosity as high as about 5 cps. at 68° F., and it is possible to operate with ink having a viscosity approaching 10 cps., although the jet printing process becomes increasingly difficult to control as the ink viscosity increases. A viscosity of about 1.90 cps. is considered optimal.

The propensity for the solvent to wet the substrate, as measured by the property of surface tension of the solvent and of the ink composition incorporating it is of great importance and must be carefully controlled. Water, for example, will not properly wet the surface of a TFS can because of its undesirably high surface tension (72 dyne cm. at standard temperature) and inks having a water base are not satisfactory for use in metal can printing, although such inks have been employed in jet printing of paperboard, for example, since paperboard surfaces are readily wet by water. On the other hand, oxygenated solvents such as ketones, alcohols, ethers and esters, which have surface tensions much lower than water, may wet TFS cans so readily that the coated metal surface is flooded by the solvent, which spreads out and merges with other droplets to obscure the limits of any indicia printed by use of these solvents. The inks of the present invention, as used on a TFS can surface are compounded to have surface tensions at 68° F., of between about 22 and 35 dyne cm., the lower portion of this range being generally preferred.

In order to be effective in the formulation of a jet printing ink for metal cans, the solvent medium must readily dissolve sufficient amounts of the dye, the electrolyte and any desirable optional components to achieve the desired level of conductivity and visual impact of the ink composition. Further, since some degree of evaporation of solvent will occur in the ink supply and ink return systems, thereby increasing the solids concentration of the composition in these areas, the solvent must have a reserve solvent power sufficient to prevent precipitation in this situation.

Although evaporation of the solvent from the ink supply and return systems is generally undesirable, it is important that the solvent evaporate sufficiently rapidly from the printed image area in order to leave the printed indicia smearproof and moistureproof fairly promptly after the printing operation is carried out. The solvent blend must achieve a satisfactory balance in evaporative properties between these opposed objectives.

As previously mentioned, in order for an ink to perform satisfactorily in an ink jet printing system, the ink must have a high degree of conductance, or conversely, a low specific resistivity. Since most organic solvent ink systems are deficient in this respect, the compositions of this invention include as components thereof a moderate amount of water and an electrolyte, thereby greatly increasing the conductance of the ink and its ability to accept an electrical charge on the droplets as they are projected at the substrate target to be printed. The addition of water to a basically organic-solvent-system ink tends to reduce the solution stability of the system, and it has been found desirable to include an organic surface active agent in the ink in order to restore and maintain the stability of the ink composition. In this connection, it is most convenient to employ as the electrolyte, a highly ionized surface active agent such as sodium lauryl sulfate, which thereby serves the dual purpose of providing the conductance to the ink and, at the same time, lending solution stability to the overall ink system, which now includes both water and an organic solvent of somewhat limited compatibility therewith. It is, of course, obvious that separate components may serve these individual roles, the surface active agent being of a non-ionic type and the electrolyte being a salt such as lithium chloride, which has a relatively high solubility in solvent systems such as those utilized herein. In the preferred compositions, however, a single component displaying surface active properties and also being strongly ionized is utilized. Anionic surfactants such as sodium lauryl sulfate, alpha methyl sodium lauryl sulfate are most desirable, and various cationic surfactants may also be used, although the wetting properties of the cationics are somewhat less satisfactory in the ink systems of this invention than those of the anionic surfactants.

Colorants or dyes suitable for use in the ink compositions of this invention are of two types hereafter described as (a) reactive and (b) extractible/non-extractible pairs. cl A. REACTIVE DYES Suitable dyes of this type are those which undergo a visible and permanent color change when exposed to temperatures above about 215° F. in the presence of steam and which are soluble in the liquid ink base and compatible with the components thereof.

A preferred class of dyes are those which may be classified as substituted phenazines and diazotization products thereof derived by diazotization of safranines, e.g., 3,7-diamino- 2,8-dimethyl-5-phenyl-phenazinium chloride, with naphthols, phenols, aminobenzenes, etc. Representative dyes may be represented by the formula:

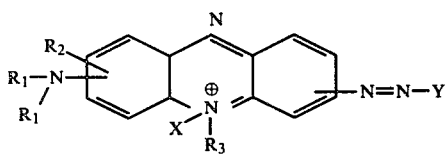

wherein $R_1$ and $R_2$ are lower alkyl radicals or hydrogen, X is an anion, for example, $Cl^-$, $Br^-$; $R_3$ is an aromatic hydrocarbon radical, for example phenyl, tolyl, xylyl, etc., and Y is an aromatic hydrocarbon radical or substituted aromatic hydrocarbon radical, for example, 3-hydroxy-naphthyl, p- dimethyl aminophenyl; p-hydroxyl-phenyl; 2-hydroxyl-4-ethyl amino-5-methylphenyl; 1,2-dihydroxypropyl-4-aminophenyl, etc.

Exemplary of such dyes are those available commercially as Janus Green B (C.I. Blue 11050); Janus Blue or Indoine Blue (C.I. 12211); Janus Black (C.I. 11825); Copying Black SK (C.I. 11957) and Copying Black 1059/1427 (C.I. 11090).

Although the mechanism by which the reactive dyes undergo a color change are not known with certainty, it is believed that they undergo a chemical reduction of the azo linkage under the conditions of the sterilization or pasteurization resulting in a residual color forming moiety similar to that of Safranine O(3,7-diamino-2,8-dimethyl-5-phenyl-phenazinium chloride). Such a reaction may also involve a reduction generated on the metal surface.

It is contemplated that other reactive dyes not specifically enumerated, but of sufficient compatibility, solubility and reactivity under the described conditions to undergo a color change, may also be employed.

In general, the dyes are present in the composition in amounts varying from about 0.1% to about 5% by weight of the composition.

The preferred dyes are the diazo-phenazine class of dyes enumerated above which have been found to exhibit a dark blue color upon application to the substrate and to undergo a color change ranging from pink to red after being subjected to a temperature of at least about 215° F. in the presence of steam for periods of time ranging from about 5 to about 30 minutes.

B. EXTRACTIBLE/NON-EXTRACTIBLE DYE PAIRS

Suitable dyes of this type are those which function in combination to undergo a visible and permanent color change when exposed to temperatures above about 120° F. in the presence of water or steam. In addition to such color transition characteristics, the dyes must also be soluble in the liquid ink base and be compatible with components thereof.

As contemplated herein, pairs of dyes having differing solubilities or extractability in water are employed. For example, a specific combination may contain a water-extractible red dye and a relatively non-water-extractible blue dye. The extractible dye is employed in a weight ratio sufficient to give a discernible color change upon its extraction, preferably at least about 2:1 of extractible to non-extractible dye. Upon exposure to water at about 120° F. or higher the red dye is leached out or extracted and the substrate color thus changes from purple to a permanent and visible blue color. The leaching step which is critical to the successful operation of the invention is not observed when water at temperatures below about 120° F. is employed. Additionally, no change in color or leaching takes place when the organic coating penetrated is fully cured or cross-linked.

Particularly good results have been obtained when using Victoria Blue as the non-extractible blue dye and Methyl Red as the more soluble leachable red dye. Other suitable extractible/non-extractible combinations may be illustrated by Victoria Blue/Palacet Yellow in which a green to blue color change occurs upon extraction of Palacet Yellow.

Preferably extractible dye pairs are employed which change color at temperatures as low as about 120° F. others which change color at somewhat higher temperatures may be employed if desired. The temperature at which the dye becomes extractible is believed to be both a function of its water-solubility as well as of the complexity of the dye molecule and therefore will vary depending on the particular dye involved.

It will be obvious that other extractible/non-extractible dye pairs of the same or different color combinations, although not specifically enumerated hereinabove but of sufficient compatibility, solubility, etc. with the components of the ink composition to function as desired, may be employed.

In general, the dyes will be present in the composition in amounts varying from about 0.1% to about 5% by weight of the composition with the soluble dye being present at levels sufficiently high to give a discernible color change upon its extraction. In other words, the relative proportions may be such that the dyes blend to form an intermediate color or one dye may so predominate that only its color is visible in the blend. As long as there is a visible color change upon extraction, such combinations are useful herein.

The following examples are illustrative of ink compositions according to this invention which are effective thermotropic jet inks.

EXAMPLE 1

The following composition was formulated:

|  | Weight % |
| --- | --- |
| 2-heptanone | 57 |
| methyl alcohol | 12 |
| 1-decene | 3 |
| sodium lauryl sulfate | 13 |
| water | 14 |
| Janus Blue | 1 |

TFS cans, coated with an epoxy resin coating, were printed with the ink of the above composition by known ink jet printing techniques with excellent results, both as to the legibility of the printed indicia and their durability when subjected to steam sterilization procedures customarily employed in the canned food and beverage industry and to abrasion tests which substantially obliterate indicia printed with standard, commercially available inks. Subjecting the cans to sterilization in the presence of steam at 240° F. for about 20 minutes resulted in a visible color change from blue to red.

In the above composition, other aliphatic ketones ranging in molecular structure from 2-butanone to 2-octanone may be substituted for 2-heptanone with substantially comparable results, although 2-heptanone is preferred as having the optimum combination of evaporative and wettability properties. Higher molecular weight ketones are somewhat slower to evaporate, thus limiting the speed of the printing operation, whereas the lower molecular weight ketones evaporate so rapidly that the ink does not achieve optimum penetration into the interior structure of the polymeric resin coating on the metal can surface. Amides or acetals of comparable molecular weight may also be used. Other suitable oxygenated aliphatic or cyclic solvents which may be substituted in whole or in part for the 2-heptanone in the above composition include ethers such as the propyl and butyl ethers, furans and dioxans, and esters such as ethyl, propyl and butyl acetate.

The function of the decene in the above composition is to cut through or penetrate the thin layer of oily material which serves as a lubricant on the resin coated metal surfaces of can components in the can forming operations. Other effective grease-cutting aliphatic hydrocarbon solvents having carbon chains of between 8 and 12 carbons, including decane, dodecene, nonane, octane or isoctane may be substituted, if desired, although decene is preferred as having the optimum evaporative properties. A solvent of this nature is not necessary if the substrate being printed does not have an oily surface. Molded plastic products and many plastic resin coated substrates are free of such oily residues and decene type solvents are not required in the ink composition in printing on such substrates.

The methyl alcohol component lends homogeneity to the composition and may enhance conductivity. It may range from about 6 to about 25 percent by weight in the composition, the lower limit being established by the necessity to keep the dye and 2-heptanone in solution and the upper limit to prevent separation of the surfactant. Ethyl alcohol, n-propyl alcohol or isopropyl alcohol may be substituted in whole or in part for the methyl alcohol utilized in the above composition. Methyl alcohol is preferred because of the lesser effect which variations in the concentration of this solvent have on the conductivity of the ink. Inks wherein ethyl or propyl alcohols are used are relatively sensitive in this respect and frequently show a high specific resistivity (poor conductance) if the concentration of the alcoholic component is increased by even a comparatively slight degree.

The presence of water in the ink composition assures sufficient electrolytic strength so that the ink performs properly in the jet printing operation. The percentage of water should not exceed about 35%, however, or the composition will not wet the substrate sufficiently to enable the desired degree of drop spreading and penetration.

EXAMPLE 2

The following ink composition was formulated:

|  | Weight % |
| --- | --- |
| 2-heptanone | 57 |
| methyl alcohol | 12 |
| 1-decene | 3 |
| sodium lauryl sulfate | 13 |
| water | 14 |
| Victoria Blue | 0.6 |
| Palacet Yellow | 0.4 |

The procedure of Example 1 was repeated and comparable results were obtained, the markings undergoing a visible change in color from blue green to blue.

It will be seen from the above that the compositions of the invention, in addition to their use as jet inks, are also valuable sterilization indicators which can provide multiple functions in the packaging industry. For example, use of the compositions to imprint indicia on metal cans permits the packager to determine upon visual inspection of any given batch of cans that the containers have been exposed to minimum retort conditions of the character encountered during food processing. Additionally, the presence of such visible indicia permits the ready rejection of individual containers that have not been processed and traceability of the origin of the container in the event of defects either in the container or its contents. Additionally, provision of a thermotropic ink usable in jet printing provides for obtaining the above-mentioned functions more rapidly, permits faster code or character changes and eliminates damage to the containers caused by many of prior contact printing methods.

We claim:

1. A binderless ink composition, suitable for use in ink jet printing operations and capable of bonding to synthetic polymeric resin surfaces by softening and swelling the surface layers of the polymeric resin to allow penetration of the ink, which comprises a solution of:
   (1) a colorant selected from the group consisting of
      (a) a reactive thermotropic dye capable of exhibiting a visible color change upon exposure to steam at a temperature of at least about 215° F. and (b) a combination of dyes of different color capable of exhibiting a visible color change upon exposure to water or steam at a temperature of at least about 120° F.;
   (2) a solvent consisting essentially of from about 10 to about 35 percent of water, from about 6 to about 25 percent of an aliphatic alcohol having 1 to 3 carbon atoms or mixtures thereof and from about 25 to about 75 percent of an organic compound selected from the group consisting of aliphatic and cyclic ketones, amides, acetals, ethers and esters;

(3) from about 8 to about 17 percent of a surfactant and (4) from about 0 to about 10 percent of an aliphatic hydrocarbon having from 8 to 12 carbon atoms, the total percentage of the components amounting to 100%.

2. An ink composition as claimed in claim 1, wherein said colorant is a reactive thermotropic dye.

3. An ink composition as claimed in claim 1, wherein said colorant is a combination of dyes of different color.

4. An ink composition as claimed in claim 2 or 3, wherein said organic compound is 2-heptanone, said aliphatic alcohol is methanol or mixture thereof with ethanol, said surfactant is sodium lauryl sulfate and said aliphatic hydrocarbon is 1-decene.

5. An ink composition as claimed in claim 4, wherein said thermotropic dye is a phenazine dye.

6. An ink composition as claimed in claim 4, wherein said combination of dyes is an extractible/nonextractible dye pair.

7. A binderless ink composition, suitable for use in ink jet printing operations and capable of bonding to synthetic polymeric resin surfaces by softening and swelling the surface layers of the polymeric resin to allow penetration of the ink which comprises a solution of 1% of a reaction pehenazine dye capable of exhibiting a color change upon exposure to steam at a temperature of at least about 215° F., 57% 2-heptanone, 12% methanol, 3% 1-decene, 13% sodium lauryl sulfate, and 14% water.

8. An ink composition as claimed in claim 7 wherein said dye is Janus Blue.

9. A binderless ink composition, suitable for use in ink jet printing operations and capable of bonding to synthetic polymeric resin surfaces by softening and swelling the surface layers of the polymeric resin to allow penetration of the ink which comprises a solution of 1% of a combination of dyes of different color of which one is extractible upon exposure to water or steam at a temperature of at least about 120° F., 57% 2-heptanone, 12% methanol, 3% 1-decene, 13% sodium lauryl sulfate and 14% water.

10. An ink composition as claimed in claim 9 wherein said dye combination is 0.6% Victoria Blue and 0.4% Palacet Yellow.

11. A method of indicating sterilization of articles having synthetic polymeric resin surfaces which comprises applying markings to a surface of said article using a binderless ink composition comprising a solution of:

(1) a colorant selected from the group consisting of (a) a reactive thermotropic dye capable of exhibiting a visible color change upon exposure to steam at a temperature of at least about 215° F. and (b) a combination of dyes of different color capable of exhibiting a visible color change upon exposure to water or steam at a temperature of at least about 120° F.;

(2) a solvent consisting essentially of from about 10 to about 35 percent of water, from about 6 to about 25 percent of an aliphatic alcohol having 1 to 3 carbon atoms or mixtures thereof and from about 25 to about 75 percent of an organic compound selected from the group consisting of aliphatic and cyclic ketones, amides, acetals, ethers and esters;

(3) from about 8 to about 17 percent of a surfactant;

(4) from about 0 to about 10 percent of an aliphatic hydrocarbon having 8 to 12 carbon atoms; the total components amounting to 100%, and exposing the marked articles to water or steam at sufficient temperature for a sufficient time to effect a visible color change in said markings.

12. A method as claimed in claim 11, wherein said articles are polymeric resin coated metal containers.

13. A method as claimed in claims 11 or 12 wherein said organic compound is 1-heptanone, said aliphatic alcohol is methanol, or mixture thereof with ethanol, said surfactant is sodium lauryl sulfate and said aliphatic hydrocarbon is 1-decene.

14. A method as claimed in claims 11, 12 or 13 wherein said markings are applied by jet ink printing of said ink composition.

15. A method of indicating steam sterilization of articles having polymeric resin surfaces which comprises:

applying ink jet printed markings to at least one surface of said article employing a binderless ink composition which swells and softens the polymeric resin to allow penetration of the ink, said ink composition comprising a solution of (1) a reactive phenazine dye, (2) a solvent consisting essentially of from about 10 to about 25 percent of water, from about 6 to about 25 percent of an aliphatic alcohol having 1 to 3 carbon atoms or mixtures thereof and from about 25 to about 75 percent of an organic compound selected from the group consisting of 2-butanone, 2-pentanone, 2-hexanone, 2-octanone, 2,4-pentandione, furan, dioxane, ethyl acetate, propyl acetate, butyl acetate, diemthyl acetamide, and mixtures thereof: (3) from about 8 to about 17 percent of a surfactant and (4) from about 0 to about 10 percent of an aliphatic hydrocarbon having from 8 to 12 carbon atoms;

and exposing the marked articles to steam at a temperature of at least about 215° F. for a period of time sufficient to effect a visible color change in said markings.

16. A method as defined in claim 15 wherein said ink composition comprises 1% Janus Blue, 57% 2-heptanone, 12% methanol, 3% 1-decene, 13% sodium lauryl sulfate and 14% water.

17. A method of indicating sterilization of articles having polymeric resin surfaces which comprises:

applying ink jet printed markings to at least one surface of said article employing a binderless ink composition which swells and softens the polymeric resin to allow penetration of the ink, said ink composition comprising a solution of (1) a pair of extractible/non-extractible dyes of different color; (2) a solvent consisting essentially of from about 10 to about 25 percent of water, from about 6 to about 25 percent of an aliphatic alcohol having 1 to 3 carbon atoms or mixtures thereof and from about 25 to about 75 percent of an organic compound selected from the group consisting of 2-butanone, 2-pentanone, 2-hexanone, 2-octanone, 2,4-pentandione, furan, dioxane, ethyl acetate, propyl acetate, butyl acetate, dimethyl acetamide, and mixtures thereof; (3) from about 8 to about 17 percent of a surfactant and (4) from about 0 to about 10 percent of an aliphatic hydrocarbon having from 8 to 12 carbon atoms;

and exposing the marked articles to water at a temperature of at least about 120° F. for a period of time sufficient to extract said extractible dye from said printed markings and thereby effect a visible color change in said markings.

18. A method as defined in claim 17 wherein said ink comprises 0.6% Victoria Blue, 0.4% Palacet Yellow, 57% 2-heptanone, 12% methanol, 3% 1-decene, 13% sodium lauryl sulfate and 14% water.

19. A method as claimed in claims 11, 15, or 17 wherein said articles are polymeric resin coated metal containers.

* * * * *